Oct. 30, 1951     D. GARDNER     2,572,851
PRODUCTION OF CARBON BY ELECTRICAL DISCHARGE
Filed Jan. 6, 1947     2 SHEETS—SHEET 1
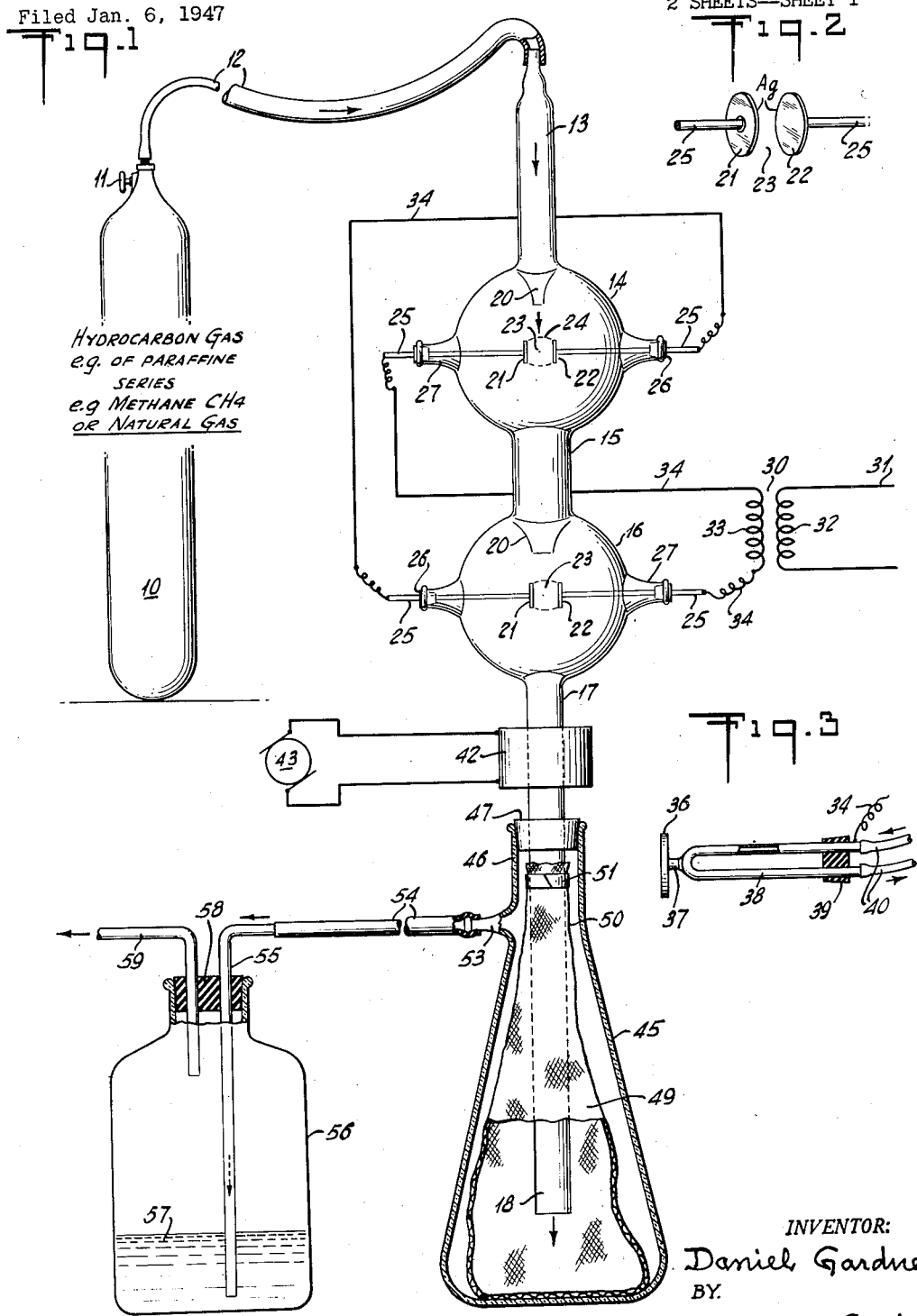
INVENTOR:
Daniel Gardner
BY
Morrison, Kennedy & Campbell
ATTORNEYS.

Oct. 30, 1951 D. GARDNER 2,572,851
PRODUCTION OF CARBON BY ELECTRICAL DISCHARGE
Filed Jan. 6, 1947 2 SHEETS—SHEET 2
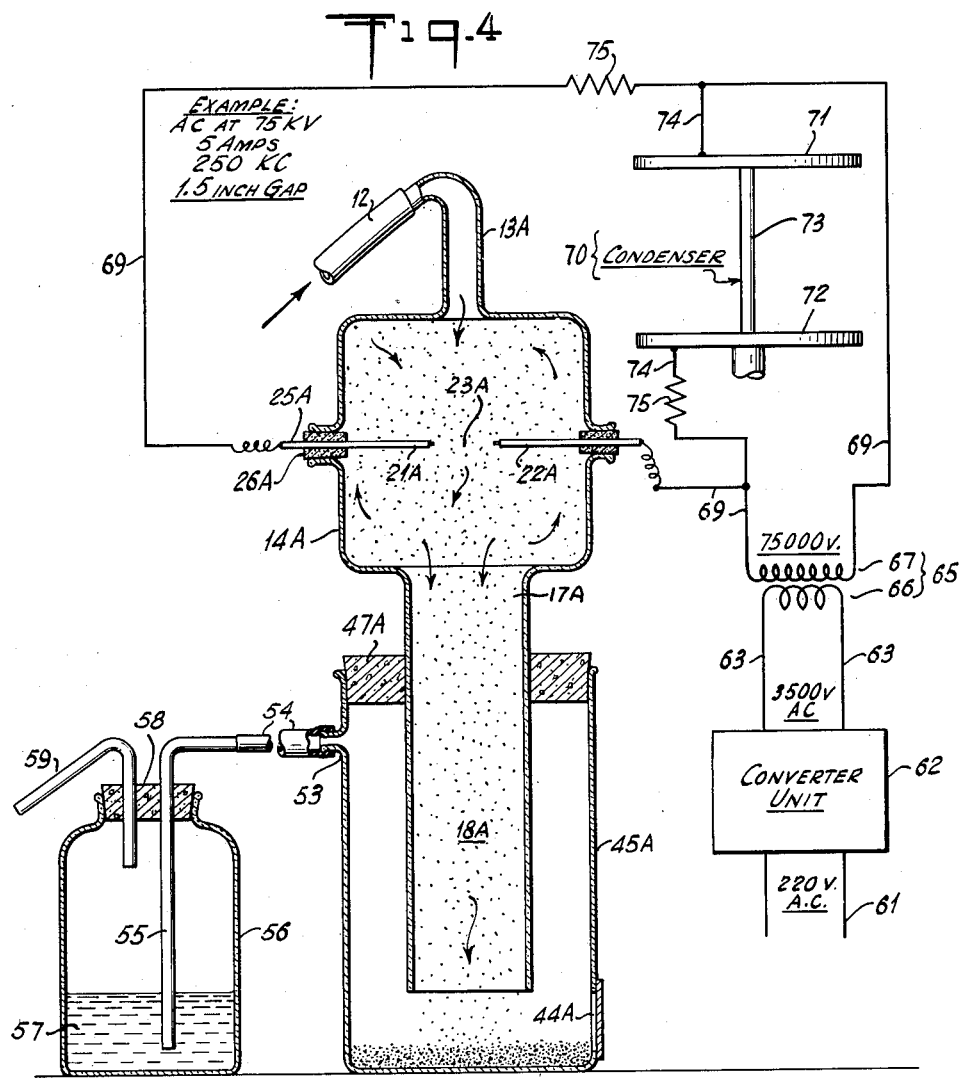
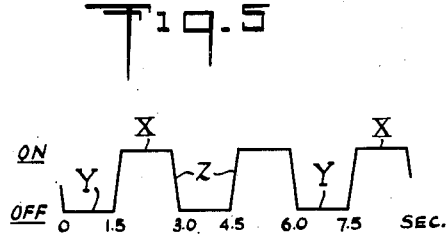
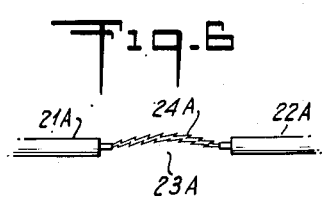
INVENTOR:
Daniel Gardner
BY
Morrison, Kennedy & Campbell
ATTORNEYS.

Patented Oct. 30, 1951

2,572,851

UNITED STATES PATENT OFFICE 2,572,851

PRODUCTION OF CARBON BY ELECTRICAL DISCHARGE

Daniel Gardner, New York, N. Y., assignor to James E. Hughes, New York, N. Y., trustee Application January 6, 1947, Serial No. 720,390

4 Claims. (Cl. 204—173)

The present invention relates to the production of carbon in chemically pure and impalpably fine state, which for convenience may be called a carbon black, having reference to a novel method and apparatus adapted for the industrial production of this important industrial commodity or product, the maximum purity and fineness of which have long been a desideratum and constitute a chief object of the present invention, the functional properties and practical value of the product depending largely thereon.

In the prevailing art a number of different kinds of carbon black are known, having varying properties and degrees of purity and fineness, and these products are frequently known and named from the raw material from which they are derived, or from the method or means for deriving or reducing the carbon material, or otherwise, and often being in fact identifiable by their impurities; example being lamp black, bone black, channel black, ebony black, acetylene black and the like.

For brevity the new product of this invention will herein sometimes be designated CPIF (chemically pure impalpably fine) carbon; and it is believed to fall within a distinctive category as to its novelty and utility. Its purity is 100 percent when the disclosed method is followed to exclude impurities. Its fineness is of the order of colloidal solids and several times at least finer than prevailing C-blacks (carbon blacks). A measure of its fineness is its volume per unit of weight. Where heretofore a pound of C-black might occupy as high as from ½ to 1 gallon of volume, the CPIF carbon of this invention may because of its fineness occupy at least five times the volume or as high as 5 gallons or more per pound. In other words applicant's product is of the low density of not over 1 pound per 5 gallons, that is, it occupies at least ⅔ of a cubic foot per pound, in its free condition as delivered by the disclosed method. The present invention therefore is distinguished in the extreme purity and fine subdivision of its product, being in that sense a novel kind of commodity or agent, better available for many industrial uses than previously known blacks, and available in some cases where the known blacks are not economically practical.

The present invention pertains particularly to the production of CPIF carbon black from hydrocarbon starting materials in gaseous form, and the product may thus be conveniently designated as a special hydrocarbon black, this term not connoting the presence of any element but carbon in the product. Certain gaseous hydrocarbon compounds or mixtures are treated, according to the method hereof, including cracking or decomposition steps, thereby to reduce the carbon content, or rather a substantial portion of it, to the form of solid carbon of the purity and fineness stated An important use of carbon blacks is as an ingredient dispersed thoroughly in soft rubber or similar plastic materials, the black acting as a filler and as an agent improving vulcanization and increasing tensile strength and other properties; other uses being as a pigment for paints etc., as an ink ingredient, as the main ingredient of compositions for coating carbon paper, and as a constituent of hard rubber and plastic goods. A general object of the present invention is to afford a system or method for the large scale manufacture of a carbon or black which is of high quality and well adapted for the practical uses hereinabove mentioned.

Another object of the invention is to afford a system of carbon black production which will be economical both as to investment in plant and as to cost of operations, commencing with raw materials which are plentiful and giving a high rate and percentage of output therefrom of the desired CPIF carbon black product, while the gaseous residues and byproducts remain of substantial value. Other objects and advantages will be pointed out in the hereinafter following description of illustrative examples of the invention. To the attainment of such objects and advantages the present invention consists in the novel method of production of carbon black, the novel steps thereof, and also the novel apparatus therefor, all herein illustratively disclosed and described. The product itself also possesses useful novelty as already stated, especially in its chemically pure and impalpably fine properties.

The invention in the aspect of method consists in the production of a super-pure and fine carbon or black by the decomposition or cracking of a hydrocarbon gas, notably methane, into such solid carbon or black and gaseous byproducts, especially hydrogen and other hydrocarbon gases; the method comprising maintaining within a closed cracking chamber in the gap between a pair of electrodes spaced substantially apart, a high voltage discharge which may be of the character of an arc or a spark or both, while flowing a stream of the hydrocarbon gas into and through said chamber and through or close to the gap and the discharge maintained therein, to be thereby exposed to the action of the discharge; thereby causing the discharge to crack or split the molecules of gas and evolve the element carbon in the form of finely divided solid particles liberated from the compound and carried and entrained in the circulating and progressively onflowing gas supply or stream, and therebeyond passing the flow from the reaction chamber into a receiver or vessel adapted to retain and accumulate the fine carbon particles while releasing the waste or byproduct gases for outflow or disposal. The discovery is involved that the flowing of the hydrocarbon stream through the maintained high voltage discharge or arc, or under subjection to the electric energy thereof, and under particular conditions as will be set forth, affords effective decomposition of the supplied gas to yield in a practical and industrially useful manner the desired CPIF carbon or black, while leaving for combustion use or other disposal certain byproduct gases. The method and apparatus aspects of the invention will be more fully elucidated hereinbelow; the new features of the product carbon or black have been indicated.

Reference was above made to gaseous hydrocarbons as starting materials, many thereof being available, such as those of the paraffin series, preferably methane $CH_4$ or natural gas containing it; while members of other series can be similarly cracked, such as some of the acetylene or the olefin series; the method steps to be adapted to each raw material. A consideration pertaining to the invention that the pure starting material is a true gas explains substantially the ultra fineness and purity of the product. In a true gas the individual molecules are discrete particles or portions, so that the splitting tends to yield free and unalloyed carbon particles, liberated and floating in the stream of gaseous flow. Such C as remains in combination with H remains gaseous, so that only the CPIF carbon becomes precipitated and collected as discrete particles approaching molecular size.

The aspects as to apparatus, and to a large extent the method of the invention, are illustratively shown in the accompanying drawings wherein Fig. 1 portrays in principle one form of apparatus adapted for carrying out said method, the figure being largely in elevation, but partly in central section and partly in diagram, and the interior parts being seen through the preferably transparent walls.

Fig. 2 is a detached view on enlarged scale showing in perspective the mutually facing discharge electrodes of Fig. 1.

Fig. 3 is an elevation partly in section of a modified form of electrode with means for cooling and protecting it against the high temperatures generated at the maintained arc or discharge.

Fig. 4 is an elevational view of another form of apparatus, partly in section and partly diagrammatic, like Fig. 1.

Fig. 5 is a cycle diagram indicating the advantageous plan of alternating periods of discharge and cracking, being an interrupted action with intervals of suspension, e. g. for a three-second cycle, as will be further explained upon Fig. 4.

Fig. 6 is an enlarged view of the electrode ends and one form of discharge or arc therebetween adapted for the purposes of the invention.

First will be explained the illustrated apparatus of Figs. 1 to 3 apart from the method. The source of the raw gaseous material or hydrocarbon is shown as a pressure container or storage flask 10 the outlet valve 11 of which is connected by a flexible tube 12 to the inlet passage or port 13 of the cracking chamber 14, which may be a single chamber, or the first of a series of tandem chambers, being illustratively shown as connected by an outflow passage 15 extending into a second cracking chamber 16, this being shown as the final chamber and which in turn has an outlet passage 17 below which is formed or connected an extension passage 18 leading into a receiving vessel or flask 45 to be later described.

Each decomposition chamber 14, 16 etc. may be formed with an interior extension 20 of its inlet passage, in the form of a nozzle directing the inflowing stream toward the space or gap between a pair of spaced-apart electrodes 21 and 22; or other modes of ensuring treatment of substantially all portions of the gas flow or stream by the arc may be used, with or without recirculation within the chamber.

Between the electrodes 21 and 22 is the gap 23 within which is maintained the operating electric discharge, arc or spark 24 of high voltage. The electrodes are preferably formed of silver or other metal having equivalent advantages as will be described. Each electrode is shown as a disk, e. g. circular, and these disks may be of varying size, as an example the size of a dime, although in certain situations it may be desirable to have one electrode slightly larger than the other.

Each electrode 21 and 22 is mounted on a rigid lead-rod or stem 25, shown as a solid or hollow rod, and for its mounting each stem may be passed through a closing stopper 26 of material adapted to withstand the temperatures of exposure; and each stopper being fitted into a hollow neck or nipple 27 outstanding from the wall of the chamber 14 or 16. Preferably, for small or pilot plants, each cracking chamber and its extensions 13, 15 or 17, and 27, are formed of high heat resistant transparent glass, or with a window of glass, thus giving a view of the interior operations, although for large plants chambers of suitable metal, or metal and glass, or stone or earthenware, may be employed. In any case each chamber is preferably of spherical, rounded cylindrical, or cubical, or similar convex curvature so that the walls are safely distant from the hot electric arc within.

The volume of gas flow through the cracking chambers, in cubic feet per minute, may be regulated either automatically or manually by the control valve 11 at the outlet of the presure container 10; and the pressure of the released gas furnishes the force for maintaining the flow through the successive decomposition chambers and to the receiving flask 45 and therebeyond; and there may be auxiliary means to maintain and control the gaseous flow, for example, by suction at the final discharge, and with or without interior baffles for directing the circulation in relation to the maintained arcs or otherwise.

Although the electric discharge 24 is of high temperature the cracking method as a whole is considered a low temperature system, since the total heat developed is insufficient to overheat the entire atmosphere within the cracking chamber, and the walls at no point become uncomfortably warm to the touch.

For maintaining the decomposing arc 24 electric circuits are indicated which extend to the electrodes 21 and 22 by way of their stems 25. The illustrated electric circuits and devices are merely conventional, being representative of various systems adapted to deliver to the electrodes suitable currents of the required E. M. F. or pressure, in volts and, A. C. current being used, of the required frequency.

As a source of high voltage electricity there is indicated a transformer 30, fed by an A. C. circuit or main 31, e.g. at 220 v., which extends through the primary coil 32, the secondary coil 33 being connected in the high voltage circuit 34. The circuit 34 extends to all of the electrode pairs 21, 22, and may be arranged either in parallel or series, as necessary for energizing them. The circuit is shown as extending in series from the secondary 33 to the upper left electrode stem 25, thence through the upper pair of electrodes and their spark gap, thence through the second electrode stem and by an extension conductor to the lefthand stem of the lower electrode pair, the righthand stem thereof being connected back through an extension conductor to the secondary coil. Such circuit arrangements may be greatly varied as desired, and the actions within the successive cracking chambers may be progressively varied by different characters of discharge or arc, as independently energized from the source of current. Resistors, inductors, capacitors and other circuit devices may be included to meet the needs.

While the electrode stems 25 are shown in Figs. 1 and 2 as simple carrying and conducting rods, it may be desirable to protect the electrodes and stems from impairment by the high temperatures, and for this purpose cooled electrodes may be used, for example as shown in the modification of Fig. 3, wherein each electrode disk 36 is carried on a short central stem or stub 37 which in turn is mounted at the inner end of a hollow U-shape stem 38 formed of a bent piece of tubing of silver or other selected metal. With such a double stem, its two branches may be passed through a doubly perforated stopper 39 fitted into each neck extension 27 of the cracking chamber. A continuous cooling effect may be applied to the electrodes by a cooling fluid through the hollow U-stem 38, a pair of flexible tubes 40 being shown adapted to lead a cooling liquid or other fluid through the hollow electrode stem.

At a suitable point in the flow of the gas stream, preferably beyond the last cracking chamber, there is shown an optional electric coil 42 of annular form, surrounding the flow passage 17, and energized by any A. C. source 43, such as a generator, the action of which upon the flowing products, not completely understood, appears to be of practical advantage e.g. in promoting onflow of the stream and of the ionized particles therein.

Beyond the series of cracking chambers 14, 16 etc. there is provided a receiving vessel or flask 45, into which the passage 17 and its extension 18 lead for the reception of the advancing flow and retention and accumulation of the solid content thereof. For example, this vessel may be of the type known as an Erlenmeyer flask, having an enlarged or flared body, with an entrance neck 46 into which is fitted a stopper 47 having a perforation accommodating the tubular passage 17 or 18. The entire delivery from the chamber series is thus flowed into the flask 45, wherein separation is effected of the solid or reduced carbon content from the gaseous byproducts and unconverted gases. This separation may be afforded by the use of a pervious collector or bag 49, constituting a flexible receptacle, into which flows the entire delivery of the pipe 18.

The collector or bag 49 is of large surface area and is finely porous and thus permeable to the gases, permitting their escape while preventing or restricting the flow therethrough of the fine carbon particles. The collector 49 may be a bag composed of finely woven material, comparable to the dust collector bag of a vacuum cleaner, and by its use the reduced carbon black material is gradually accumulated until the collector bag is sufficiently full for removal and replacement by an empty bag.

The permeable receptacle or bag 49 is shown as having a relatively constricted neck 50, fitted around the descending passage or pipe extension 18 and there tightly secured by any suitable binding means 51, such as a tape or rubber band, before the bag is inserted within the receiving flask 45, which preferably is of transparent material to afford a view of the progress and accumulation of carbon black product. As stated, the gases which enter the pervious collector bag pass through its walls into the space between the bag and the outer wall of the receiving flask, and therefrom the gases flow out through an extension neck 53, which in turn is connected by a flexible tube 54 with the descending inlet pipe 55 of a wash bottle 56, which may be of a type known as a Drechsel wash bottle. The inlet pipe 55 leads substantially to the bottom of the bottle, and a suitable depth of wash liquid 57, such as water, is maintained in the bottle, the liquid thereby forming a trap through which the outgoing gases must bubble before rising and making their exit from the bottle, this trap thus prevents entrance of air and other harmful gases into the system. The bottle top is closed by a stopper 58 having perforations, one for the long descending inlet pipe 55 and the other for the short ascending outlet pipe 59, which may be connected in a suitable manner for utilization or disposal of the byproduct gases.

For protecting the operations, all joints should be absolutely gas-tight to exclude air, oxygen etc., which might cause explosions or other difficulties. Dilution of the hydrocarbon gas, however, by some inert gas such as hydrogen or nitrogen is permissible and may even be of advantage in improved efficiency. To ensure purity of product the electrodes may be of silver or certain other good conductors, but not of copper nor any metal which could contaminate the product, particularly any traces of manganese.

The gas may be supplied slowly, e. g. in a test apparatus as little as 6 cubic inches per minute, so that each portion traversing the reaction chamber may circulate repeatedly under exposure to the discharge. Naturally, larger feed rates will be used with full size industrial plants, especially with several discharge gaps in each chamber or successive chambers. The splitting or decomposition under the electric and thermal conditions at the gap gradually liberates minute solid carbon particles. At the start the gas atmosphere in the chamber usually tends to become cloudy, with a whitish effect, then turning brownish and finally intense black with increase of the floating carbon particles. This effect resembles a mild cloudburst and the particles tend to gather as visible specks, flakes or shreds, gradually trending downward, passing beyond the chamber toward the separation or collection place along with the uncracked residue of gas and the accompanying byproducts, such as hydrogen, ethane, amylene and other hydrocarbons, all of which have good value as gaseous fuel and otherwise.

In the discharge gap 23 the methane of course forms the atmosphere or medium, replacing the usual air gap. While a D. C. current may be caused under proper conditions to maintain a continuous arc between electrodes, the invention in its practical form is practiced by the use of A. C. current characterized by both high voltage and high frequency, producing a discharge which may be of the nature of a spark series and/or an arc.

The operation is begun with the electrodes already spaced apart and without the need of first mutually contacting and then separating them to produce a gap. The gap may vary in length, being for example 1.5 to 2 inch, with a voltage of about 60 to 80 kv., but naturally is much longer with much higher E. M. F. An E. M. F. of 60 to 80 kv. per 1.5 to 2 inches of electrode separation is equal to about 30 to 50 kv. per inch of electrode separation. The current, say at 250 kc., is thrown on after the scavenging of the chamber following the starting of the gas flow. The discharge begins with a spark oscillating across the gap and the gas in the neighborhood of the gap becomes extremely hot and conductive, taking part in the maintenance of the discharge which, it has been discovered, is able to split the hydrogen molecules, of at least a portion of the gas flow, in a manner to reduce and release the carbon thereof in the superfine or near-molecular form mentioned and in extreme purity.

Referring to its electromotive force, the current which produces the gap discharge in a small plant may be at a fairly high potential, between about 60 and 80 kv., the voltage of 75 kv. having been established as practical for the purposes. As an A. C. current and discharge, the frequency likewise should be quite high, for example between 125 and 600 kc., with a practical mean of 250 kc. In full scale plants the gaps and the voltages may be many times larger than the figures given.

The above disclosure is believed to set forth the characteristics and action of the method as performed upon the apparatus of Figs. 1 to 3. The downward settling of the floating or entrained carbon particles and the progressive exit thereof from the reaction chamber or chambers toward and to the collecting chamber 45 have been described, as well as the mode of drawing off the undecomposed gases and gaseous reaction products, while leaving the collected carbon product in a readily removable form.

While the first form disclosed in Figs. 1-3 is illustrative of the principles involved, certain modifications are desired to be illustrated, and Figs. 4 and 5 on sheet 2 are for the purpose of showing a second form of apparatus; while Fig. 6 conventionally shows one form of discharge which may represent that of the first as well as the second form of apparatus.

In the second form the preferred circuits and the electrical elements therein are more fully illustrated. As before, the flexible gas-supply tube 12 leads to the modified inlet port or passage 13A, which leads directly into the upper part of the modified decomposition chamber 14A, shown of generally cylindrical or cubical form with rounded corners and edges. From the lower part or wall of the chamber 14A descends an outlet passage 17A for the excess gases and the carbon particles entrained therein; and said passage 17A leads to an extension 18A which reaches down into the lower part of a receiving vessel or flask 45A, which may have a closable aperture 44A for the removal of the collected solid material at the lower part of the vessel, although the removal could be by extracting the stopper 47A at the upper end of the vessel and dumping the contents of the latter into a suitable bin or container. The outflow or separation of the remaining gases, as before, may be by an outlet 53 from the collecting vessel leading through tube 54 to the inlet pipe 55 of a trap or bottle 56 having a stopper 58 through which the inlet pipe and an outlet pipe 59 extend.

In Figs. 4 and 6 are shown a first electrode 21A and a second electrode 22A, the termini of which in this embodiment are not enlarged but are adequate to deliver the required discharge. The substantial gap 23A, during operation, will be occupied by the discharge 24A, whether a spark series or a continuous arc or otherwise, which supplies the electrical energy and action necessary, according to this invention, to crack the hydrocarbon material which passes through or adjacent to the discharge. As before, the electrodes are provided with rigid stems 25a which are also the leads, these passing through plugs or stoppers 26A to exterior points where they are connected into the operating circuits as will be further described.

As in the first form, Figs. 1 to 3, the second form of apparatus as shown in Fig. 4 comprises circuits designed to provide, for the purposes of discharge at the gap 23a, the required high voltage, of the order of many thousands of volts, and, in this instance, a very high frequency of alternating current, of the order of radio-frequency. While the values of these and other factors may not be critical in the full sense, it is at least essential that they exceed certain large values, differing according to the conditions presented, in order to deliver the described actions and practical results. Moreover, since those conversant with the electrical science understand well how to convert and transform electric energy to afford substantially any desired voltage, amperage and frequency, or other factors, no claim is herein made to the details of the electrical means illustrated for such purposes; nor on the other hand is it desired to limit the invention to the particular electrical means herein disclosed as illustrative examples. It is further to be understood that the circuits herein illustrated are subject to modification or supplementing, in ways well known in the electrical art, for example by introducing any suitable devises adapted to provide resistance, inductance and/or capacitance, as may be necessary most effectively to develop and maintain the working form of discharge by which the methane or other hydrocarbon gas is to be decomposed to yield the superior form of carbon of this invention.

The precise type and character of the discharge used for this invention, under the recited conditions including the high voltage and high frequency, are not attempted to be completely described, nor are its character and type to be circumscribed so long as the discharge operates efficiently to crack the hydrocargon gas. The operative set-up, including the gas-filled chamber, and the means for applying to the substantial gap therein the specified A. C. at high voltage and high frequency, constitute the basic facts by which is established and maintained a kind of discharge, believed to be novel, which can decompose the methane or other hydrocarbon gas and liberate part of its carbon in high purity and subdivision.

The theory may be offered, however, that the discharge contains the elements or factors both of an oscillating spark series and a second action which may be loosely called an arc, being in that aspect a combination discharge, which might be designated a spark-arc. The electrodes, it is observed, are not required to be brought into mutual contact for starting the cracking operation but, with the relatively small gap of 1.5 inch, the designated voltage is well able to disrupt the gas in the gap and deliver a stream of oscillating sparks between electrodes. It is observed however that the A. C. spark action alone is inadequate for practical cracking action. After the discharge is thus started it is believed that the interposed and adjacent gas, by that time highly heated, becomes also ionized, and thus able to travel between the electrodes for the formation of a convective type of discharge flow or arc. The spark train and the second or arc discharge action possibly may exist at the same time and cooperatively, as a duplex kind of action, in describing which the term arc is used only in a special sense.

Whatever the exact structure of the discharge, it is believed that the methane or other gas between the electrodes, becoming ionized and exposed to the electrical energy and heat of the discharge becomes vulnerable to these conditions and possibly to impacts or collisions or other phenomena occurring within the influence of the discharge, thus permitting the bonds between the carbon and hydrogen components of the gas molecules to be broken, by a chemical action or decomposition, thus releasing the carbon as a solid product, composed of ultra-fine particles approaching molecular size, and of utmost purity, the hydrogen and all other hydrocarbons remaining in gaseous form and being thereby readily disposed of when isolating the collected solid carbon material. These observations however, largely of theory or surmise, are not intended to be binding. The E. M. F. and frequency ranges having been fully disclosed, as well as the size of gap and the manner of subjecting the treated gas, flowing into and from the chamber, to the action of the discharge, sufficient data is believed to have been stated to enable the practice of the invention method for the production of the new carbon material of this invention. Naturally, the more slowly the gas is fed to and through the cracking chamber the greater will be the proportion thereof which is split to liberate carbon.

Referring specifically to Fig. 4 a source 61 of A. C. electricity is shown in the form of a pair of line conductors. This line circuit 61 leads to what is herein termed a converter or transformer unit 62, the specific character of which will be further described, the result of its action being to deliver, in its output circuit 63, a highly increased or multiplied E. M. F., such as 3500 volts A. C., or of that order. The unit 62 functions further to convert the initial frequency, such as 60 cycles per second, to the high frequency already mentioned, such as 250 kc.

The 3500 voltage (3.5 kv.) being insufficient for the best results of the invention the A. C. flow is next passed to an induction transformer 65, the circuit 63 being connected directly to the primary element or coil 66 of the transformer, composed of a few turns of heavy wire; the secondary coil 67 being composed of a great many turns of a fine wire; thus greatly stepping up the E. M. F.

The transformer secondary 67 is positioned in the main circuit 69 of the discharge gap and, in association with the other circuit elements, operates to deliver to the electrodes an A. C. current of high voltage, for example 75 kv., at the aforesaid high frequency of 250 kc. The current however need not be unduly large and may be as low as 5 amperes, by suitable means, with good results.

Into the discharge gap circuit 69 may be introduced impedance elements, such as a resistor, which may be variable for adjusting the action; or a reactance element 75 in the form either of an inductor or capacitor; or any combination of these elements, according to electrical practice. Thus there is shown as a circuit element a capacitor 70, in the form of a condenser consisting of an upper plate 71 and a lower plate 72, spaced well apart and mounted upon a dielectric support or post 73. This condenser is shown interposed in a cross circuit 74, connected into the main circuit 69 to bridge or shunt around the electrode pair between which the discharge gap is formed. The condenser plates may be of the order of 15 by 24 inches in size, with a six inch air gap between them. The condenser, connected in parallel with the gap circuit 69, which is a radio-frequency circuit, is important in controlling the current fed to the electrodes, tending to concentrate the current at the desired point, and intensifying the discharge and the resulting action. The electrodes may be of silver, or other precious metals, but not any magnetic metals or any metals which normally tend to form carbides. The entire system may be arranged on a much larger scale than stated; the voltage, instead of being 75 kv., may be up to 250 kv., or even higher, with a discharge gap of the order of 12 or 14 inches or higher.

Referring further to the cracking action within the gas chamber, it should be noted that proper dilution of the fed gas sometimes has the advantage of promoting the break-up of the hydrocarbon. For example, with progressive increase of the hydrogen content within the chamber the rate of cracking may appreciably increase, up to limits of serious depletion of the starting gas. Bearing in mind this consideration, there is a special advantage in the tandem or multiple arrangement of several chambers as shown in Fig. 1; since this multiple system provides a series of successive discharges, for example within the successive chambers; the progressive dilution causing increase of production and therefore economical operation throughout the system. These considerations however are subject to the further observation that there should be no serious exhaustion of the carbon contained in the starting gas, and indeed, at the final outlet, the major portion of the CH$_4$ or other hydrocarbon should remain uncracked, it being therebeyond subject to recovery and valuable usefulness. In a well connected cracking plant the losses are found to be very low or negligible. With multiple cracking in series, as described, the successive gaps must be carefully coordinated, usually in a manner to equalize them, or the discharges traversing them, so as to insure productive cracking action at each discharge point or chamber; such coordination of related operations to be preferably automatic regulation.

The converter unit 62 is shown merely as a box or cabinet, representing any apparatus adapted to increase greatly the voltage and frequency of A. C. power. As an instance this may be a so-called high frequency induction heating unit herein used to boost E. M. F. and frequency for the purposes of the invention. Such a unit, of 5 kw. capacity is manufactured and marketed in this country by several concerns. The 220 volt A. C. supply received by this unit is applied to a series of thermionic tubes, usually in series, to effect amplification and rectification, raising the current for example to about 3500 v. of D. C. at 1.5 amps. or 5 kw. By an oscillator tube and its circuit the D. C. current is at the same time converted to an oscillating or A. C. flow, with output approximately at 3.5 kv. and frequency of 250 kc., being the natural frequency of the oscillator device as installed or adjusted. Other kinds of oscillators could be used, such as that comprising a combination of induction and capacity means.

In the marketed high-frequency unit referred to is comprised an additional device or instrument by which intermittency of action and gap-discharge are provided, typically by means of a general switch adapted for example to interrupt or periodically suspend reactions, that is, to thrown on and off the initial current supply, which was discovered to be of advantage in the method of the present invention; the reaction being continuous during on periods. As an example the switch may be sharply operated by means of a timed solenoid so as to give reversals between open and closed positions. This intermittent action is indicated in Fig. 5 of the drawings wherein it appears that each cycle of operation extends for about 3 seconds, divided into on periods of 1.5 seconds and off intervals of 1.5 seconds; there being 20 cycles or 40 throws of the switch per minute. In other words the cracking action proceeds for 1.5 seconds, or other predetermined period, and is then suspended for a given or equal interval. Thus intermittent relief is afforded, preventing undue heating at the spark gap, and the action is found also to be of help in regard to the circulation of the supplied gas and the efficiency of the cracking thereof. When inspecting the described operation, the slow circulating motion of the gases, continuing during the off intervals, is readily perceived, both by the movement of the carbon particles within the gas flow and by the action at the trap or wash bottle 56, the latter showing a violent bubbling during each active or on period, doubtless due to heat expansion of the gases within the chamber, while during the quiescent intervals the bubbling at the trap ceases. In the diagram Fig. 5 X represents the succesive periods of closed-switch operation, with electric current flow and gap discharge; while Y represents the intervening intervals of open switch, during which the gas continues circulating movement within the chamber; the lines Z of the diagram representing the switch reversing actions between periods and intervals.

There have thus been described several illustrative embodiments of the principles of the invention in the aspects of method, apparatus and product; but since many matters of method, step, operation, materials, apparatus, arrangements and combinations, as well as products, may be variously modified without departing from the principles of the invention it is not intended to limit the invention to such matters except to the extent set forth in the appended claims.

What is claimed is:

1. The low-temperature dry method of production of a solid carbon product consisting of carbon in a pure and impalpably fine state, and of the low density of not over about 1 pound per 5 gallons as delivered by such production method, comprising the step of decomposing partially without combustion a supplied stream of a dry starting hydrocarbon gas selected from the group consisting of the paraffin gases and the olefin gases and mixtures thereof, thereby to split up a substantial fraction of such starting gas to yield such dry carbon product entrained in the unreacted part of the starting gas, said decomposing step being carried out by maintaining within a dry and gas-tight, air-and-oxygen-free gas chamber, and in the gap between spaced electrodes therein, an A. C. discharge of voltage of about 30 to 50 kilowatts per inch of electrode separation and of a frequency of about 125 to about 600 kilocycles per second, while flowing the supplied gas stream into and through said chamber within reactively exposed proximity to the decomposing action of such discharge therein, thereby liberating from such fraction of the flowing dry gas its carbon content in the form of minute dry solid particles suspended and entrained in the gas flow, and beyond such gas chamber passing the dry gas flow and entrained carbon particles into a dry receiving space and there separating out in dry form such gas-entrained fine carbon particles, by precipitation as a free mass, from the residual and byproduct gases, for dry outflow of such gases and collection of such free carbon product in a dry, pure and impalpably fine state.

2. The dry method as in claim 1 wherein the A. C. discharge is of a frequency of about 250 kilocycles per second and of a voltage of about 75 kilovolts, and the electrode gap is such that the A. C. discharge can start without initial electrode contact.

3. The dry method as in claim 1 wherein the A. C. discharge is an arched one comprising an oscillating spark series which acts, during working operation, to ionize the gas exposed to the discharge and thereby to aid the breaking up of the molecular bonds thereof for chemical splitting and liberation of solid carbon from the gas.

4. The dry method as in claim 1 wherein the high-frequency A. C. decomposing action is methodically interrupted, in a cycle of duration of several seconds comprising pausing intervals between active periods of A. C. discharge, constituting an off-and-on cyclic operation, with continuous decomposing reactions during each on-period, while the off-intervals provide substantial suspensions and relief from the A. C. frequency and voltage conditions, thereby promoting accelerated precipitation from the dry gases of dry carbon particles during and between such pauses.

DANIEL GARDNER.

REFERENCES CITED

The following references are of record in the file of this patent:

UNITED STATES PATENTS

| Number | Name | Date |
| --- | --- | --- |
| 1,352,085 | Rose | Sept. 7, 1920 |
| 1,597,277 | Jakowsky | Aug. 24, 1926 |
| 1,813,514 | Schmidt et al. | July 7, 1931 |
| 1,912,373 | Jakosky et al. | June 6, 1933 |
| 2,164,164 | Price | June 27, 1939 |
| 2,357,857 | Grotenhuis | Sept. 12, 1944 |

OTHER REFERENCES

Jakowsky, Electrical Manufacture of Carbon Black, Technical Paper No. 351, Bureau of Mines, 1924.